(12) United States Patent
Delage et al.

(10) Patent No.: US 10,784,007 B2
(45) Date of Patent: Sep. 22, 2020

(54) STORAGE RACK FOR NUCLEAR FUEL ASSEMBLIES

(71) Applicant: TN INTERNATIONAL, Montigny le Bretonneux (FR)

(72) Inventors: Olivier Delage, Les Clayes Sous Bois (FR); Yohann Gore, Magny les Hameaux (FR)

(73) Assignee: TN INTERNATIONAL, Montigny le Bretonneux (FR)

( * ) Notice: Subject to any disclaimer, the term of this patent is extended or adjusted under 35 U.S.C. 154(b) by 263 days.

(21) Appl. No.: 15/779,279

(22) PCT Filed: Dec. 1, 2016

(86) PCT No.: PCT/EP2016/079385
§ 371 (c)(1),
(2) Date: May 25, 2018

(87) PCT Pub. No.: WO2017/093376
PCT Pub. Date: Jun. 8, 2017

(65) Prior Publication Data
US 2018/0350476 A1    Dec. 6, 2018

(30) Foreign Application Priority Data

Dec. 3, 2015   (FR) ...................................... 15 61816

(51) Int. Cl.
*G21F 5/012* (2006.01)
*G21C 19/07* (2006.01)
*G21D 5/12* (2006.01)

(52) U.S. Cl.
CPC ............. *G21F 5/012* (2013.01); *G21C 19/07* (2013.01); *G21D 5/12* (2013.01)

(58) Field of Classification Search
CPC ............ G21F 5/012; G21F 5/12; G21C 19/07
(Continued)

(56) References Cited

U.S. PATENT DOCUMENTS

| 7,961,834 B2 * | 6/2011 | Andre ................... G21C 19/07 376/272 |
| 8,705,683 B2 * | 4/2014 | Tamaki .................. G21C 19/07 376/272 |
| 2017/0229199 A1 | 8/2017 | Delage et al. | |

FOREIGN PATENT DOCUMENTS

FR    2 650 113 A2    1/1991
FR    2 872 955 A1    1/2006
(Continued)

OTHER PUBLICATIONS

Preliminary French Search Report for French Application No. 1561816 dated Sep. 12, 2016.
(Continued)

*Primary Examiner* — Jack W Keith
*Assistant Examiner* — Daniel Wasil
(74) *Attorney, Agent, or Firm* — Pearne & Gordon LLP (57) ABSTRACT

A racking device is provided for storing and/or transporting nuclear fuel assemblies. The racking device includes first stages (Ei−1, Ei+1) for neutron absorption and thermal conductivity, as well as second stages (E2i) for mechanical strength arranged so as to alternate with the first stages. Each first stage (Ei−1, Ei+1) includes first and second assemblies having interlacing notches (6a, 6b) made of aluminium alloy including boron. Each second stage (Ei) includes first and second structures (7a, 7b) stacked in a stacking direction (8) and each is made of one or more materials which are free of neutron-absorbing elements. The first and second structures (7a, 7b) are free of notches on their opposite edges in the stacking direction (8).

18 Claims, 9 Drawing Sheets

(58) Field of Classification Search
USPC .......................................................... 376/272
See application file for complete search history.

(56) References Cited

FOREIGN PATENT DOCUMENTS

| | | |
|---|---|---|
| JP | 2014-016323 A | 1/2014 |
| WO | 2014/010386 A1 | 1/2014 |

OTHER PUBLICATIONS

International Search Report for International Application No. PCT/EP2016/079385 dated Mar. 27, 2017.

\* cited by examiner

FIG. 13

STORAGE RACK FOR NUCLEAR FUEL ASSEMBLIES

TECHNICAL FIELD

The present invention relates to the field of transporting and/or storing nuclear fuel assemblies, preferably used assemblies within which the fuel has been irradiated.

STATE OF PRIOR ART

Such a device, also called a storage "basket" or "rack", comprises a plurality of adjacent housings each able to receive a nuclear fuel assembly.

This storage device, intended to be housed in a cavity of a package, is designed so as to be capable of simultaneously fulfiling three essential functions, which will be briefly set out below.

There is first the thermal transfer function of the heat released by the fuel assemblies. Generally, aluminium or an alloy thereof is used, because of its proper heat conductivity.

The second function relates to the neutron absorption, and the worry of maintaining the sub-criticality of the storage device when this is loaded with the fuel assemblies. This is made by using neutron absorbing materials, such as boron. Additionally, the sub-criticality can also be ensured by providing spaces likely to be filled with water, for example just inside the partitions delimiting the housings of the storage device.

Finally, the third essential function relates to the mechanical strength of the device. It is noted that the overall mechanical strength of the device has to be compatible with regulatory safety requirements for transporting/temporarily storing nuclear materials, in particular as regards the so-called "free fall" tests.

From prior art, it is known to form the basket by superimposing stages made using stacked and interlaced notched structural assemblies. These assemblies are made using a same aluminium-based material, comprising a strong boron density in order to fulfil the neutron absorption function.

However, this type of boron material is expensive, which makes up a real drawback when it is used in significant volumes. This is the case in this design type, given that to fulfil the thermal function, it is necessary to provide a significant thickness to "transport" the heat flow. By way of indicating purposes, a basket designed in this way can require up to 3 to 5 tonnes of aluminium alloy comprising boron.

In this regard, it is noted that this design suffers from a paradox in that the higher the boron content is in the alloy, the more degraded is the thermal function. It is thus difficult to lead to a satisfactory compromise to properly fulfil both these thermal absorption and thermal transfer functions, mainly when this compromise has also to take usual requirements in terms of overall mass and costs into account. Indeed, the increase in the thickness of the notched assemblies of boron material seems to be an obvious theoretical solution to decrease the boron content in these assemblies, and thus to reduce the costs thereof. However, this is strongly detrimental to the overall basket mass, without substantially decreasing the necessary boron content to fulfil the sub-criticality criterion. To decrease the boron content to satisfactory values from a material cost point of view, widely overdimensioned thicknesses have to be provided, which are incompatible with package operating requirements.

Further, with this design providing a same boron aluminium alloy for all the stacked and interlaced notched assemblies of the basket, justifying a mechanical strength over time can turn out to be complicated to be demonstrated.

SUMMARY OF THE INVENTION

Thus, the purpose of the invention is to overcome at least partially the abovementioned drawbacks, relating to the embodiments of prior art.

To do this, the invention has the object to provide a storage device for transporting and/or storing nuclear fuel assemblies, said device including a plurality of adjacent housings, each for receiving a nuclear fuel assembly, the device including several stages stacked along a stacking direction parallel to the longitudinal axes of the housings, the latter being delimited fully or partly by said stages.

According to the invention, the storage device comprises first stages ($E_1$, $E_{i-1}$, $E_{i+1}$) for neutron absorption and thermal conductivity, as well as second stages ($E_2$, $E_i$) for mechanical strength alternately arranged with the first stages along said stacking direction, each first stage ($E_1$, $E_{i-1}$, $E_{i+1}$) comprising at least one notched assembly extending along a first direction orthogonal to the stacking direction, as well as at least one second notched assembly extending along a second direction orthogonal to the first direction as well as to the stacking direction, the first and second assemblies being interlaced and each including at least one element of aluminium alloy comprising boron, each second stage ($E_2$, $E_i$) including at least one first structure extending along the first direction as well as at least one second structure extending along the second direction, the first and second structures being stacked along the stacking direction and each made of one or more materials free of neutron absorbing elements, the first and second structures being each free of notches on their opposite edges along the stacking direction, and each having a transverse cross-section with a height substantially constant all along the same, and for at least one of the second stages $E_i$ on either side of which a first stage $E_{i-1}$ and a first stage $E_{i+1}$ are arranged, the first structure of the second stage $E_i$ rests on an edge of the first notched assembly of the first stage $E_{i-1}$ and passes through a notch of the second notched assembly of this first stage $E_{i-1}$, whereas an edge of the second notched assembly of the first stage $E_{i+1}$ rests on the second structure of the second stage $E_i$, this passing through a notch of the first notched assembly of this first stage $E_{i+1}$.

The invention is remarkable in that it provides alternate stages which fulfil specific and differentiated functions, enabling in particular the mechanical strength to be more readily justified over time. Indeed, this is ensured by the structures of the second stages, which have the only purpose to ensure the mechanical strength of the storage device, in particular in case of lateral free fall. No neutron protection or thermal transfer function is associated with these structures forming the second stages. Further, by virtue of the absence of notches on these structures, they offer a particularly high mechanical strength, while having a limited height. This reduced height of the structures of the second stages enables the height of the notched assemblies forming the first stages to be increased, which improves the neutron absorption and thermal transfer functions.

Finally, it is noted that in spite of the absence of notches on the structures of the second stages, they are however perfectly integrated in the stack, by cooperating with the notches of the assemblies forming the first adjacent stages.

This aids in obtaining a structured stack, offering an increased mechanical strength.

The invention also provides at least one of the following optional characteristics, taken alone or in a combination.

The first and second assemblies have notches on each of their opposite edges along the stacking direction. By virtue of this arrangement, the residual cross-section between the notches is substantially centred on the height of the interlaced assemblies. This allows a better mechanical strength. However, only one of the opposite edges could be provided with notches, without departing from the scope of the invention.

The alternate first structures and first notched assemblies form a first housing separating partition, on either side of which two housings are at least delimited, and the alternate second structures and second notched assemblies form a second housing separating partition, on either side of which two housings are at least delimited, the first and second separating partitions being orthogonal to each other.

Further, each first and second partition has preferably a substantially constant thickness, which enables a direct contact between the structures of the second stages and the fuel assemblies to be achieved. This provides a better transmission of transverse strains, in particular in case of lateral free fall.

Each first stage has, outside an interlaced zone between the first and second notched assemblies, a first mean height $H_1$ along the stacking direction, each second stage has, outside a crossing zone between the first and second structures, a second mean height $H_2$ along the stacking direction, and the first and second mean heights fulfil the condition $0.1 < H_2/H_1 < 0.35$. As has been discussed above, the prevalent notched assemblies enable the neutron absorption and thermal transfer functions to be properly fulfiled.

Moreover, the first height $H_1$ is preferentially higher than 100 mm. This high value advantageously limits the number of stages to be superimposed, and thus facilitates the manufacturing method.

To enhance the neutron absorption function, the boron content in at least some of said elements of aluminium alloy of the first and second notched assemblies, is higher than 25 mg/cm$^3$. However, the presence of elements with high boron content is not detrimental to the overall cost of the storage device, since these elements do not extend on the entire height of the housing separating partitions, but also within the first stages.

Each first and second structure is preferably made of steel.

Each second stage includes a junction pin at a crossing zone between the first and second structures through which this junction pin at least partially passes. This arrangement improves the mechanical strength of the storage device, although a single support could be sufficient between the two crossing structures, without departing from the scope of the invention.

Preferably, the first and second structures are each of a square or rectangular cross-section.

Further, the first and second structures each have a cross-section with a uniform or non-uniform width, this width corresponding to the thickness of the separating partitions.

Optionally, water ports extending along the stacking direction pass through each of the first and second structures.

The first and second interlaced notched assemblies are each made as a single piece, or with several pieces assembled to each other and preferably delimiting an empty space between them for circulating a film of water.

These first and second structures are each made as a single piece, or with several pieces assembled to each other.

The storage device also comprises peripheral walls arranged at the periphery of the first and second stacked stages, said peripheral walls delimiting a part of some of the housings.

Finally, the storage device is configured such that in an assembled configuration, clearances along the stacking direction are provided at the crossing/interlacing zones between the constituent elements of the stages. This enables the contact between these same elements outside their crossing/interlacing zones to be favoured.

Another object of the invention is a package for storing and/or transporting nuclear fuel assemblies, the package comprising a cavity in which a storage device as described above is housed.

One object of the invention is also a pack comprising such a package, as well as fuel assemblies arranged in the housings of the storage device of this package.

Further advantages and characteristics of the invention will appear in the detailed non-limiting description below.

BRIEF DESCRIPTION OF THE DRAWINGS

This description will be made with regard to the appended drawings in which.

DETAILED DESCRIPTION OF PREFERRED EMBODIMENTS

Figure 1:
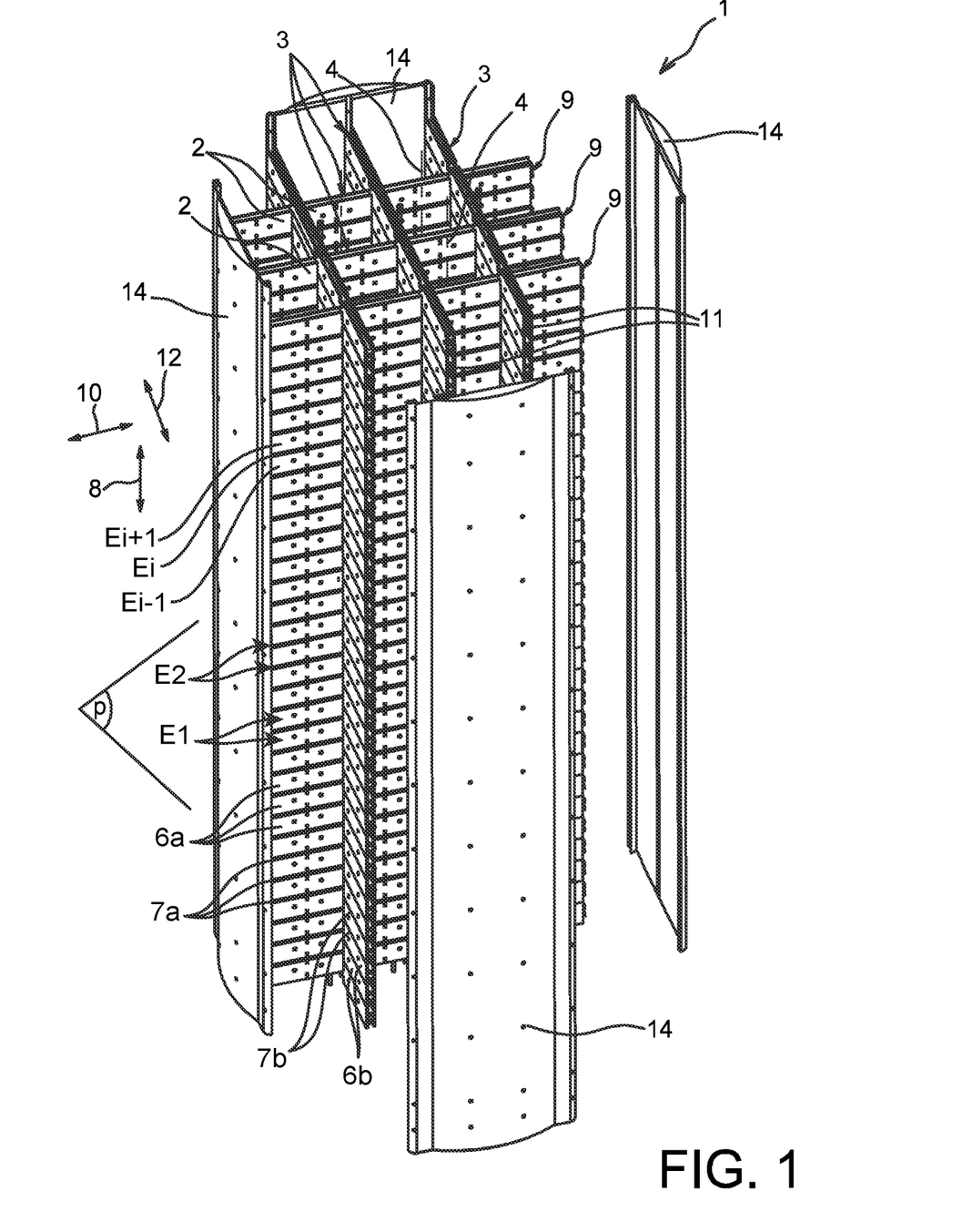
FIG. 1 represents a perspective view without details of a storage device for storing and/or transporting nuclear fuel assemblies, according to the present invention.
Figure 2:
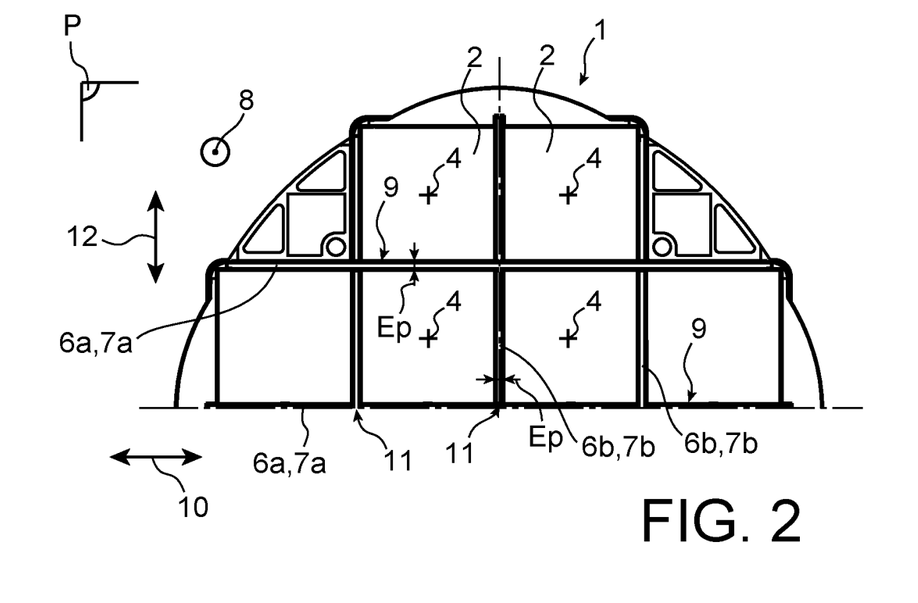
FIG. 2 is a partial transverse cross-section view taken along the transverse plane P of FIG. 1.
Figure 3A:
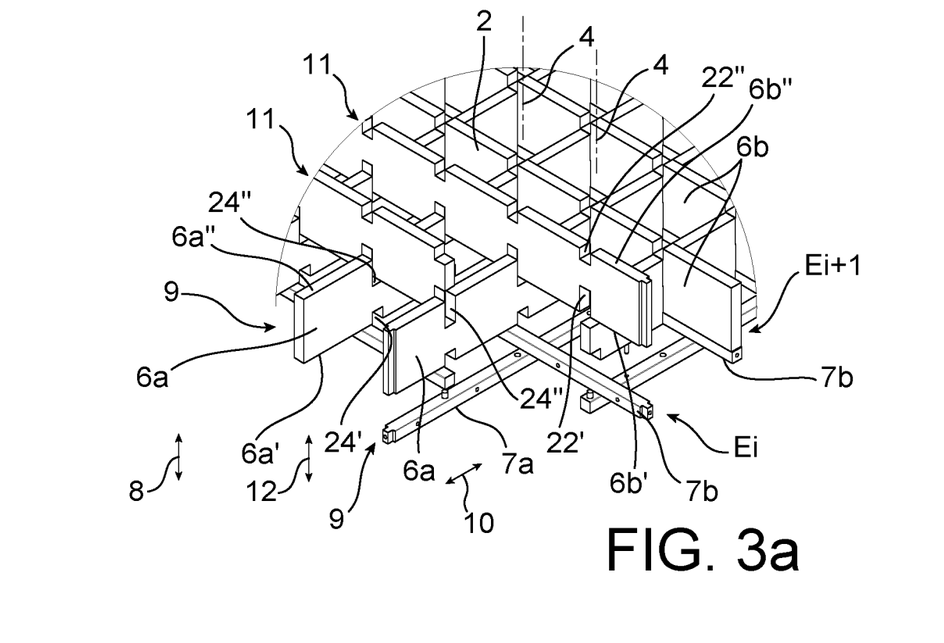
FIGS. 3a and 3b are perspective views of a part of the storage device shown according to a first preferred embodiment of the invention, upon assembling.
Figure 3B:
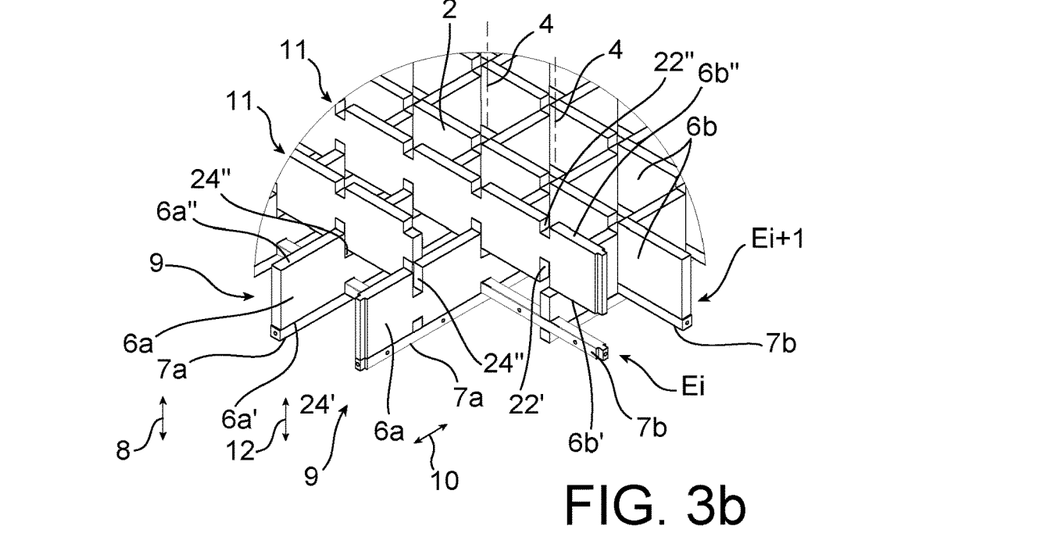
Figure 4A:
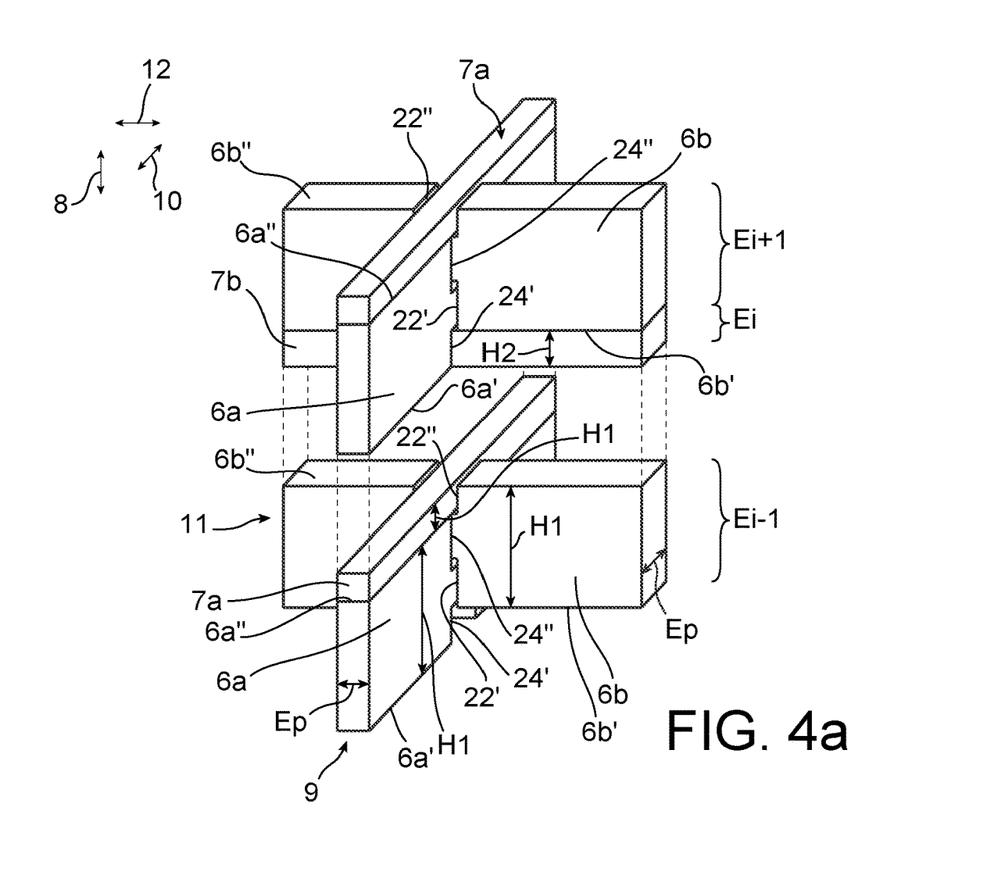
FIGS. 4a and 4b are perspective views detailing the cooperation between the constituent elements of the storage device shown in FIGS. 3a and 3b.
Figure 4B:
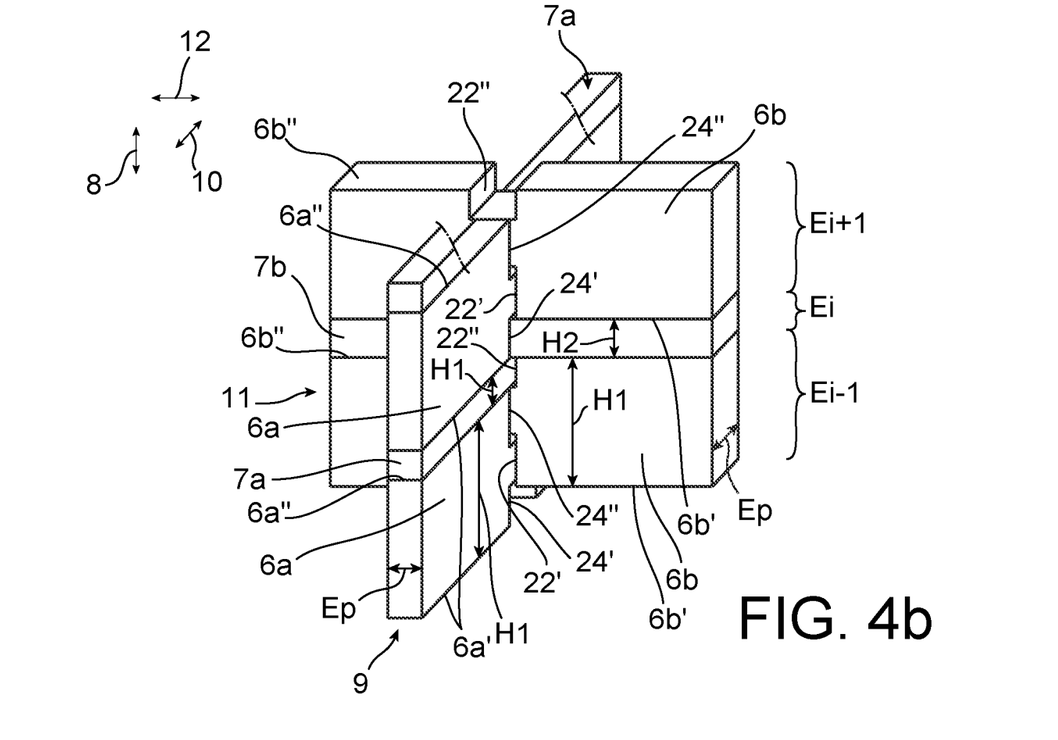

In reference to FIGS. 1 and 2, a storage device 1 is represented, provided to be placed in the cavity of a package (not represented) for transporting and/or temporarily storing irradiated nuclear fuel assemblies (not represented). Conventionally, when the package receives the storage device 1 and that this is loaded with irradiated fuel assemblies, all of these elements form a pack, which is also an object of the invention.

As is visible in FIGS. 1 and 2, the storage device 1 comprises a plurality of adjacent housings 2 disposed in parallel, the latter each extending along a longitudinal axis 4. The housings 2 are each capable of receiving at least one square cross-section fuel assembly, and preferably a single one. The housings are provided in a number between four and twenty-four, for example twelve housings as in FIG. 1.

The housings 2 are thus provided so as to be juxtaposed to each other. They are made through a plurality of separating partitions 9, 11 parallel to the axes 4, and also parallel to a longitudinal axis of the package passing through its bottom and its lid. The partitions 9, 11 are formed using different elements 6a, 6b, 7a, 7b stacked along a stacking direction 8 which is preferably parallel to the longitudinal axes 4 of the housings 2. By convention, in the following of the description, it is assumed that the notion of "height" is to be associated with the stacking direction 8.

The partitions 9, 11 are arranged parallel and perpendicular to each other. More precisely, the partitions 9, 11 are formed by first stages $E_1$ and second stages $E_2$, alternately stacked along the stacking direction 8. Each stage thus substantially corresponds to an axial segment of the device 1.

The first stages $E_1$ have a neutron absorption and thermal conductivity function. They each comprise first notched assemblies 6a, extending in parallel in a same plane along a first direction 10 orthogonal to the stacking direction 8. They also include second notched assemblies 6b, extending in parallel in a same plane according to a second direction 12 orthogonal to the first direction 10, as well as to the stacking direction 8. The first and second notched assemblies 6a, 6b are interlaced perpendicularly at their notches, as will be detailed hereinafter. Because of the cooperation between these notches, in the assembled state of the device 1, the first and second notched assemblies 6a, 6b are located in a same plane orthogonal to the axes 4. Here, these assemblies 6a, 6b correspond to solid beams made of aluminium alloy consisting boron, in which the boron content can be higher than 25 mg/cm$^3$.

Further, the second stages $E_2$ have a mechanical strength function, by being made using first structures 7a extending in parallel in a same plane along the first direction 10, and second structures 7b extending in parallel in a same plane along the second direction 12. The first and second structures 7a, 7b are stacked along the stacking direction 8. They can be directly superimposed with each other, or a small clearance can be provided at their crossing zone, as will be described hereinafter. They are preferably made of steel, or in any other analogous material free of neutron absorbing elements. By neutron absorbing elements, it is intended elements which have an effective cross-section higher than 100 barns for the thermal neutrons. By way of indicating examples, these are materials free of boron, gadolinium, hafnium, cadmium, indium, etc.

When the elements 6a, 6b, 7a, 7b are stacked along the direction 8, in the order given by these reference numerals, the partitions 9, 11 resulting therefrom delimit together the housings 2 each having a substantially square or rectangular shaped transverse cross-section. Of course, the housings 2 could have any other form allowing a fuel assembly with a different shape, such as a hexagonal shape, to be maintained.

Preferably, each of the assemblies 6a, 6b, 7a, 7b extends between two peripheral partitions 14 to which it is fastened, these peripheral partitions 14 enabling the stack of stages $E_1$, $E_2$ forming the basket core to be closed sideways.

By way of indicating example and as represented, these peripheral partitions 14 can be four in number, can each extend on the entire height of the device 1, and partly delimit the peripheral housings 2 of this device 1.

On the other hand, as clearly appears from the above, the partitions 9, 11 aid in delimiting several housings 2 on either side of the same. Each partition 9, called a first partition, is obtained by alternately stacking the first notched assemblies 6a and first structures 7a, whereas each partition 11, called a second partition, is obtained by alternately stacking the second notched assemblies 6b and the second structures 7b. In their respective stackings, the elements 6a, 6b, 7a, 7b are stacked by having preferably always the same orientation.

Here, each partition 9, 11 has a substantially constant thickness Ep, by virtue of identical widths assumed for the elements 6a, 6b, 7a, 7b constituting them. This makes it possible to have substantially planar internal surfaces for delimiting the housings 2, against which surfaces the fuel assemblies can be arranged based on a planar support.

In reference now to FIGS. 3a to 4b, the design of each of the first and second stages of the basket, as well as the cooperation of adjacent stages will be detailed, according to a first preferred embodiment of the invention. To do this, in these figures, any second stage referenced $E_i$, as well as two first adjacent stages $E_{i-1}$ and $E_{i+1}$ respectively located on either side of the second stage $E_i$ are represented. For the sake of clarity of the description, the terms "upper" and "lower" will be used in the following, in relation with the orientation of the device as it appears in the figures.

Figure 5:
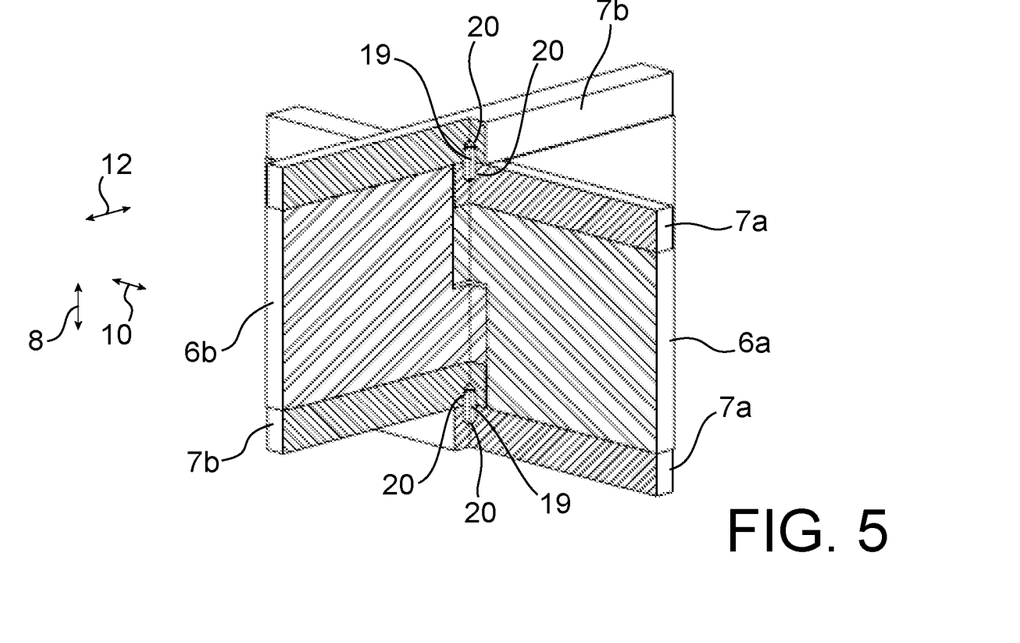
FIGS. 5, 6a and 6b show the storage device according to an alternative embodiment.

First, it is noted that to achieve a high mechanical strength, each first and second structure 7a, 7b of the stage $E_i$ is free of notches on its lower and upper opposite edges, the height of the transverse cross-section of each of these structures 7a, 7b being substantially constant all along the structure considered. In this regard, the transverse cross-section of these beam-shaped structures is preferably square or rectangular, the width of this cross-section being uniform all along the same and corresponding to the thickness Ep of the associated separating partition 9, 11. The beams 7a, 7b are solid and each made as a single steel piece. However, as has been depicted in FIG. 3a, at a crossing zone between the first and second structures 7a, 7b, these can be pierced with a blind or through port 20. Both facing ports 20 accommodate a junction pin 19 enabling a mechanical connection to be ensured between both these beams 7a, 7b of a same second stage of the basket. The pin 19 thereby fulfils the shearing pin function in case of lateral free fall, that is a free fall during which the basket moves along a direction orthogonal to the axes 4 of the housings. However, a single support could be retained between both these beams 7a, 7b, without departing from the scope of the invention. A more detailed view of this solution with junction pins 19 is shown in FIG. 5. This figure corresponds to a storage device according to the alternative embodiment represented in FIGS. 6a and 6b, but the pin implantation principle represented therein remains applicable to the mode shown in FIGS. 4a and 4b.

Still in reference to FIGS. 3a to 4b, it is noted that in this preferred embodiment, each first and second assembly 6a, 6b has notches on its two lower and upper opposite edges. More precisely, each first assembly 6a has notches 24' on its lower edge 6a', whereas it has also notches 24" on its upper edge 6a". In the same way, each second assembly 6b has notches 22' on its lower edge 6b', whereas it has also notches 22" on its upper edge 6b".

So as to limit manufacturing costs, the elements 6*a* and 6*b* have an identical cross-section (height and thickness) and the notches 24', 24" are respectively and substantially of the same height as the notches 22", 22'. The elements 6*a* and 6*b* are also substantially identical.

For each first stage $E_{i-1}$, $E_{i+1}$, the notches 22' and 24" can cooperate two by two such that their respective bottoms are in contact with each other, but a small clearance along the direction 8 remains the preferred solution. By virtue of this interlacing nested between both beams 6*a*, 6*b*, and at a height of notches 22', 24" extending on at least 30% (and at most of 45%) of a first mean height $H_1$ of the beams, the coverage extent between these beams 6*a*, 6*b* along the direction 8 corresponds preferably to more than 60% of their height, which enables them to be considered arranged substantially in a same transverse plane of the basket. In this regard, it is indicated that outside an interlaced zone between these beams 6*a*, 6*b*, they each have a first mean height $H_1$ preferably higher than 100 mm. This height is much higher than a second mean height $H_2$ of the structures 7*a*, 7*b* outside of their crossing zone, since these heights are dimensioned so as to fulfil the condition $0.1 < H_2/H_1 < 0.35$.

As previously indicated, in the interlaced zone between the beams 6*a*, 6*b*, a small mounting clearance is preferred at the bottoms of the notches 22', 24". The same is true between the bottom of the notch 24' and the upper edge of the structure 7*b*, the lower and upper edges respectively of the structures 7*b* and 7*a*, the bottom of the notch 22" and the lower edge of the structure 7*a*. This arrangement makes it possible to favour a contact between the elements 6*a*, 6*b*, 7*a*, 7*b* outside the interlaced/crossing zones, and thus ensures a very stable mounting, the supports being achieved on higher element lengths. By doing so, a hyperstatic structure is also avoided. It is noted that this feature is also applicable to the other preferred embodiments of the invention.

In the assembled configuration of the basket obtained by the cooperation of the notches 22' and 24", the beams 6*a*, 6*b* of the stage $E_{i-1}$ are nested such that the upper edge 6*a*" is substantially in the continuity of the bottom of the notch 22". Consequently, the first structure 7*a* of the second stage $E_i$ rests at its lower edge on the upper edge 6*a*" of the first notched assembly 6*a* of the first stage $E_{i-1}$. This first structure 7*a* also passes through the notch 22" of the second assembly 6*b* of this first stage $E_{i-1}$, such that its upper edge is substantially in the same plane as the upper edge 6*b*" of the second assembly 6*b* of this first stage $E_{i-1}$. This enables the second structure 7*b*, of the second stage $E_i$, to rest with its lower edge on the upper edge 6*b*" of the second assembly 6*b* of the first stage $E_{i-1}$.

In addition, the lower edge 6*b*' of the second notched assembly 6*b* of the first stage $E_{i+1}$ rests on this second structure 7*b*. This also passes through the notch 24' of the first assembly 6*a* of the first stage $E_{i+1}$, such that its lower edge is substantially in the same plane as the lower edge 6*a*' of the first assembly 6*a* of this first stage $E_{i+1}$. This enables this first assembly 6*a* of the first stage $E_{i+1}$ to rest, with its lower edge 6*a*', on the upper edge of the first structure 7*a* of the second stage $E_i$. The first assembly 6*a* of the first stage $E_{i+1}$ is thus disposed and oriented in the stack in the same way as the first assembly 6*a* of the first stage $E_{i-1}$, and it is then the same for all the other elements 6*b*, 7*a*, 7*b*, participating in gradually making the alternate first and second stages along the direction 8.

Figure 6A:
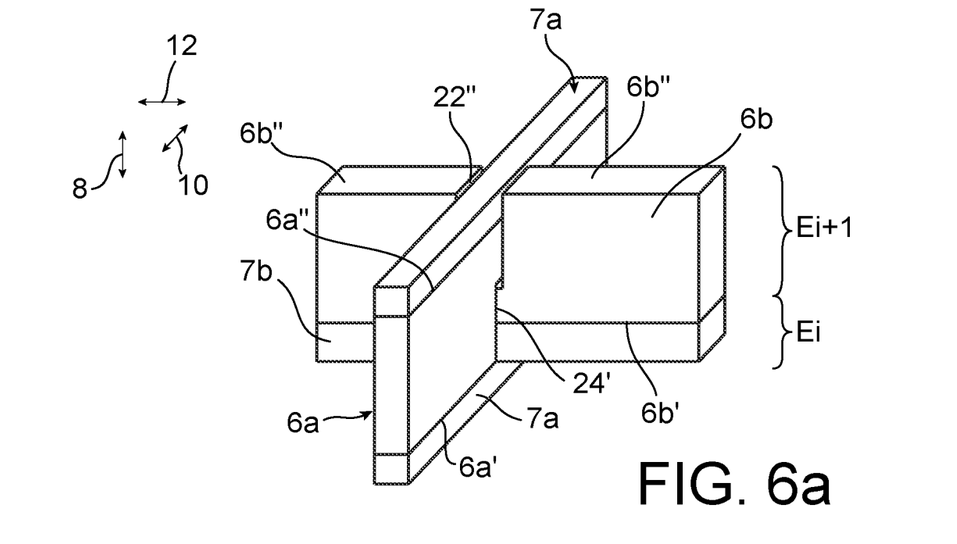
Figure 6B:
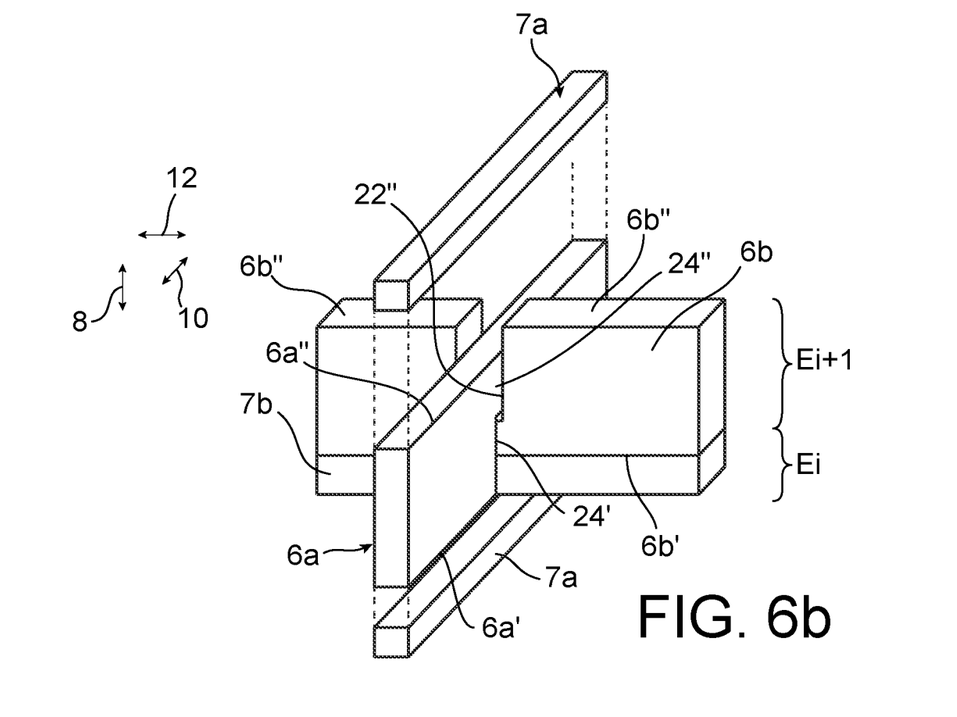

FIGS. 5, 6*a* and 6*b* represent an alternative embodiment for the first mode described above. Besides, in the figures, the elements bearing the same reference numerals correspond to identical or similar elements. In this alternative, the only modification with respect to the configuration previously described resides in the design of the first and second notched assemblies 6*a*, 6*b*, which have only notches on one of their opposite edges. Indeed, for the first assembly 6*a*, only the notch 24' is preserved on its lower edge 6*a*', but its upper edge 6*a*" remains free of notches. In the same way, for the second assembly 6*b*, only the notch 22' is preserved on its upper edge 6*b*", but its lower edge 6*b*' remains free of notches. In the assembled state in which the notches 22", 24' cooperate with each other such that their respective bottoms are in contact with each other or with a small clearance along the direction 8, the terminal part of these notches 22", 24' each let a free space appear, such that the first structure 7*a* and the second structure 7*b* pass therethrough, respectively. Thus, this free space in the notches 22", 24' has a height substantially identical to the height of these structures 7*a*, 7*b* passing therethrough.

In this particular case, making the first and second stages alternately is made by stacking the elements 6*a*, 7*a*, 7*b*, 6*b* in the direction 8.

Figure 7:
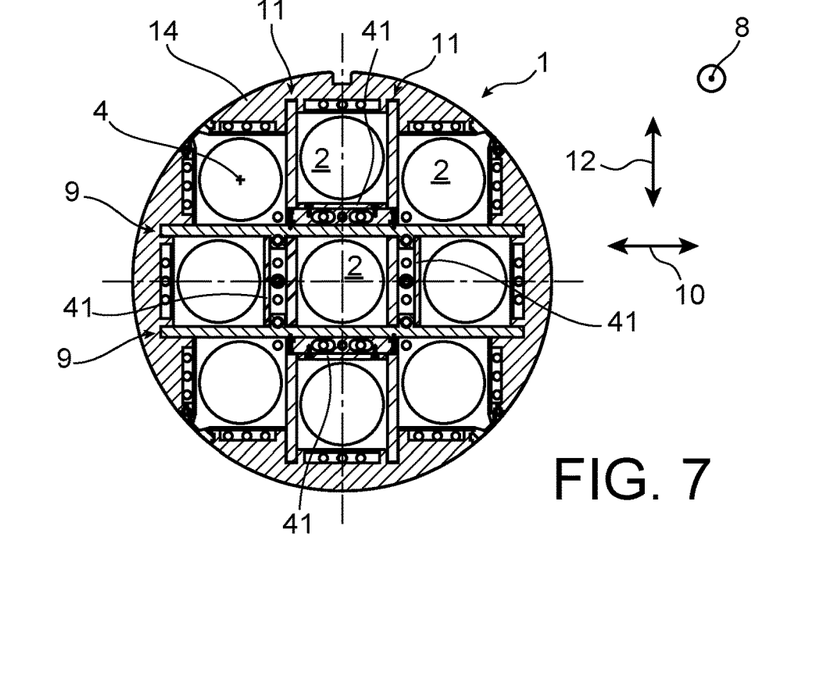
FIG. 7 is a transverse cross-section view of a storage device according to a second preferred embodiment of the invention.
Figure 8A:
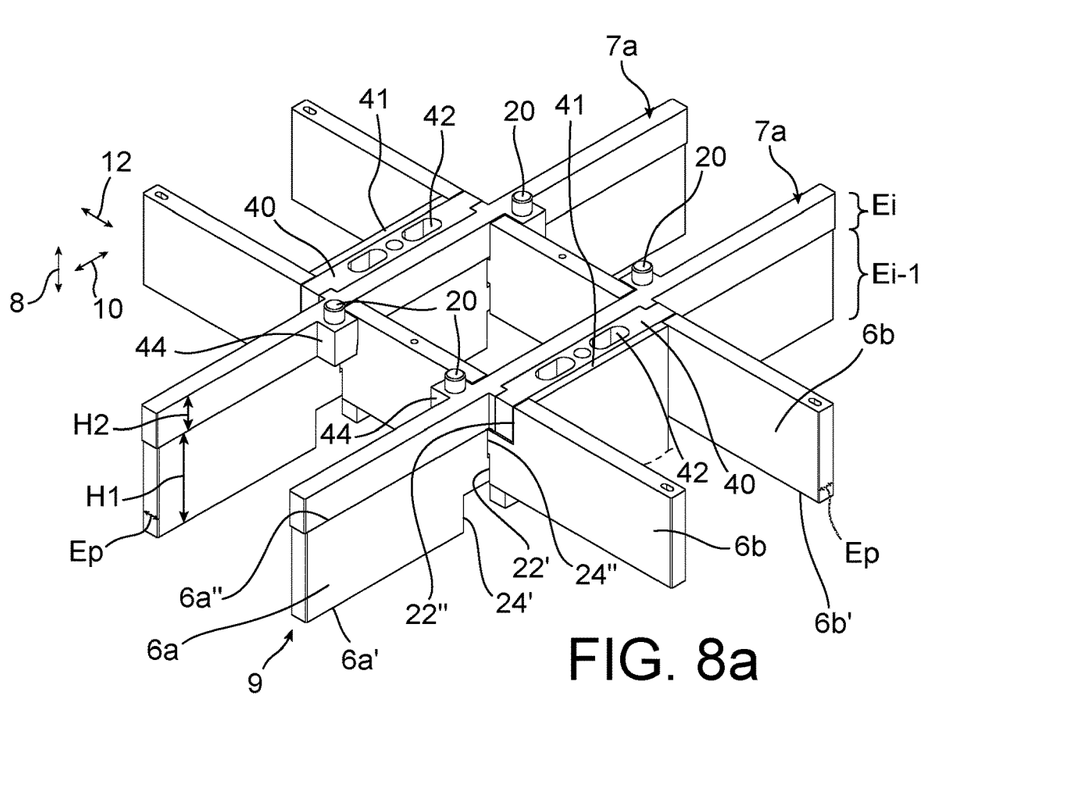
FIGS. 8a and 8b are perspective views detailing the cooperation between the constituent elements of the storage device shown in FIG. 7.
Figure 8B:
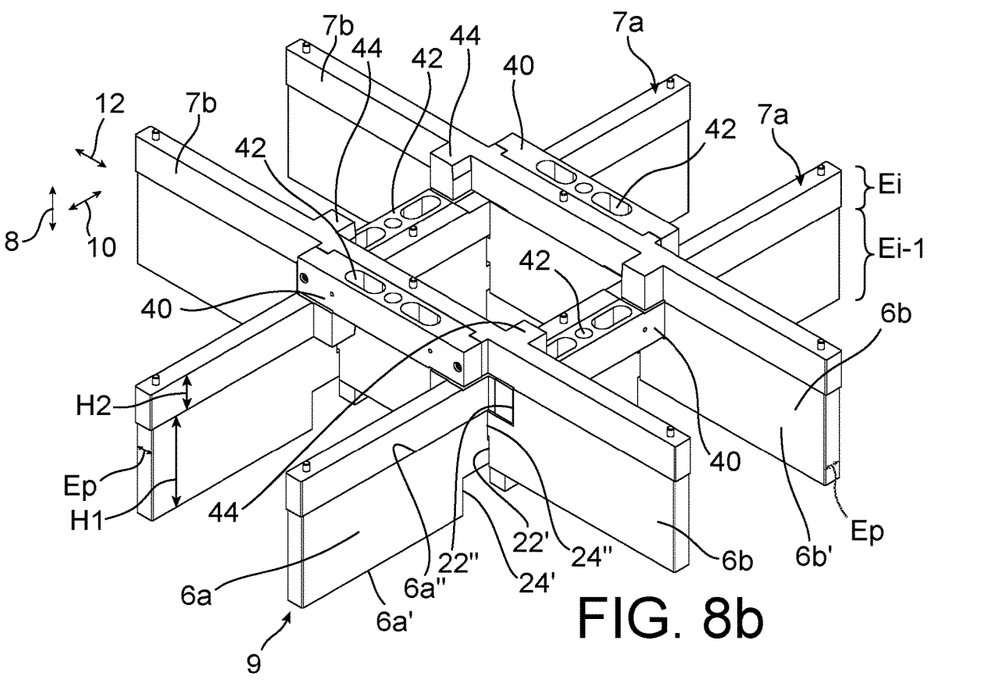

FIGS. 7 to 8*b* represent a second embodiment, in which some parts of separating partitions 9, 11 comprise a first and a second wall delimiting therebetween a space likely to be filled with water, enabling a film of water to be implemented around one or more housings. The first walls are made using the notched elements 6*a*, 6*b*. Once again, the second mode has many similarities with the first one, such that in the Figs., the elements bearing the same reference numerals correspond to identical or similar elements.

In this second preferred embodiment, the centre housing 2 is fully surrounded with water film partitions, whereas the peripheral housings are in turn free of such a film. To do this, the first and second structures 7*a*, 7*b* have a transverse cross-section with a non-uniform width, with a thickened portion 40 at their portions defining the centre housing 2. As is visible in FIG. 8*a*, the side surfaces of each thickened portion 40, opposite to the centre housing, are provided to receive plates 41 for closing the water film partition (only two plates 41 out of four have been partially represented in FIG. 8*a*, for the sake of clarity, whereas these plates have all been represented in FIG. 7, and all been removed in FIG. 8*b*).

These closing plates 41, free of notches and with a width substantially equal to that of the peripheral housing they partly delimit, thus make up the second wall of the water film partition. This second wall is made using several plates abutted to each other and stacked in the direction 8, but a single plate, with a length substantially equal to the height of the partition, could also be suitable.

As for the elements 6*a*, 6*b*, the closing plates 41 are made of a material comprising neutron absorbing elements, preferably, an aluminium based alloy.

Each thickened portion 40 here consists of a separated member secured to the beam essentially forming the structure 7*a*, 7*b*, the attachment being preferably operated using screwed connections. The water ports 42 which are offset sideways from the notched assemblies 6*a*, 6*b* directly adjacent in the stacking pass through the second portion, in order to allow water circulation through the ports and all along the partition. Consequently, along the partitions, water passes between the assemblies 6*a*, 6*b* and the closing plates 41 at the first stages, whereas it passes through the water ports 42 at second stages.

In addition, with the lateral offset of the water ports 42, each beam preserves a satisfactory working cross-section, susceptible of achieving a proper mechanical strength. Each beam also has carrier lugs 44, at which the junction pins 20 are arranged between the structures 7a, 7b. The lugs 44 are preferably arranged at the ends of the thickened portion 40 respectively, on the other side of the beam with respect to the latter.

Figure 9:
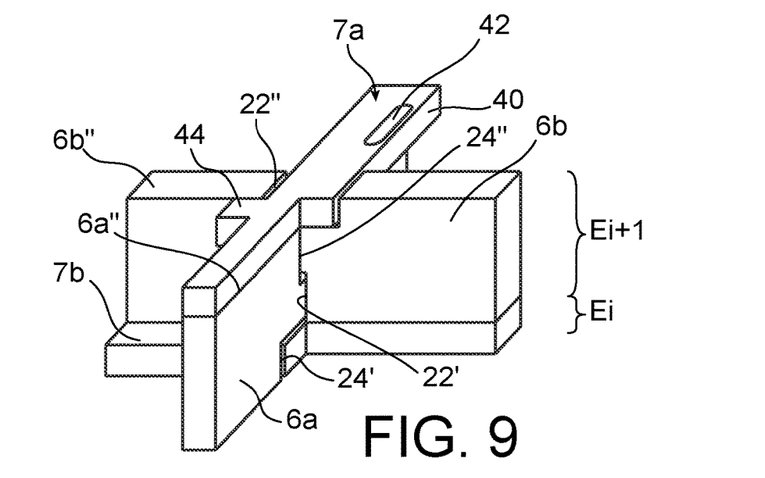
FIG. 9 is a view analogous to that of FIG. 8a, with the storage device shown according to an alternative embodiment.
Figure 10:
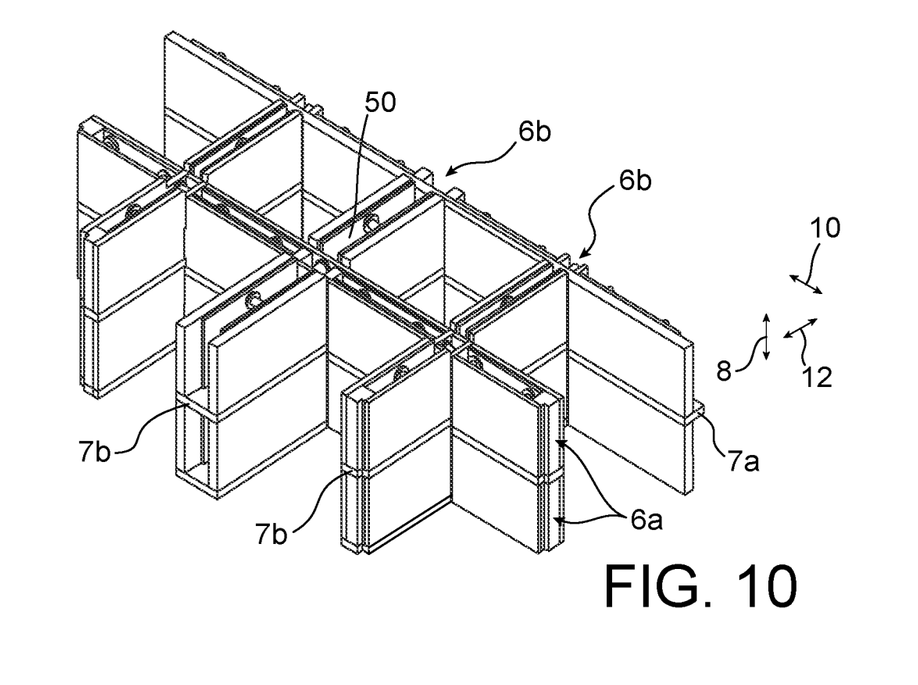
FIG. 10 is a perspective view of a part of a storage device according to a third preferred embodiment of the invention.
Figure 11:
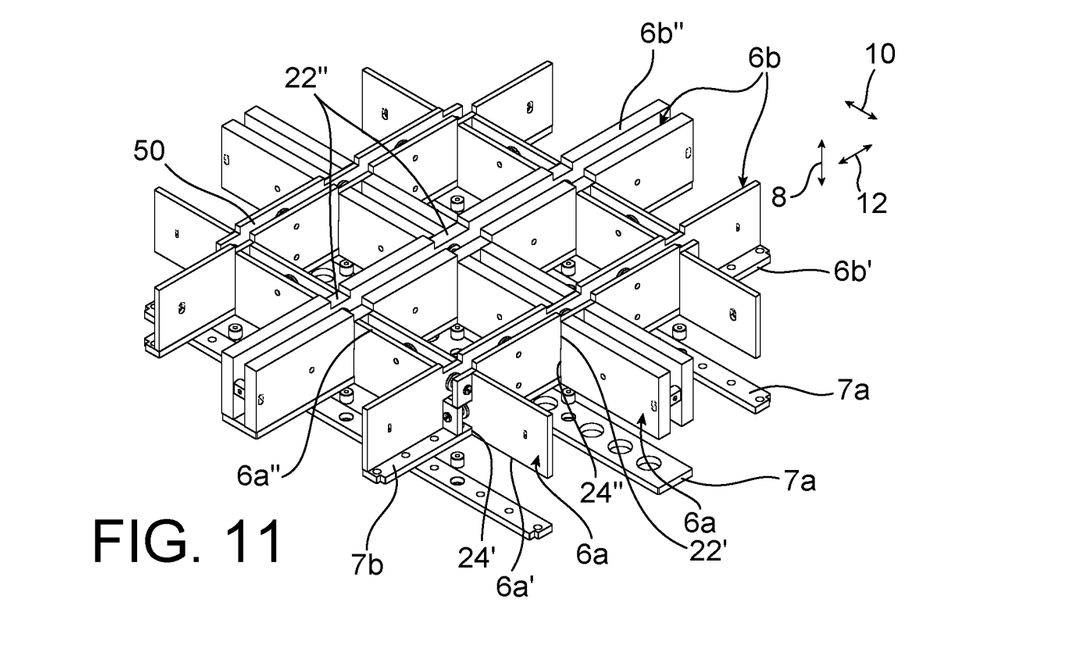
FIG. 11 is a perspective view detailing the cooperation between the constituent elements of the storage device shown in FIG. 10.
Figure 12:
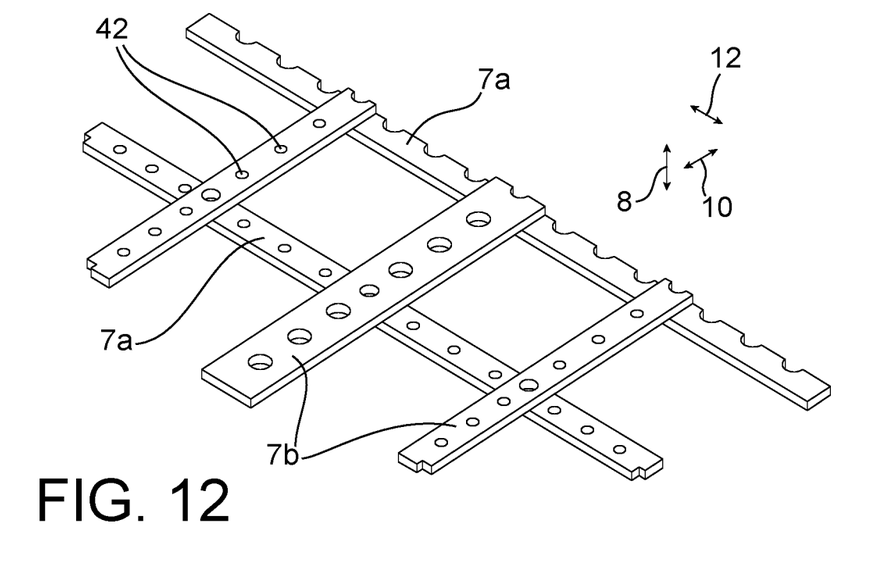
FIG. 12 is a perspective partial view of a second stage for mechanical strength of the storage device shown in FIGS. 10 and 11.

In the alternative embodiment shown in FIG. 9 (in which the closing plates 41 have not been represented), each structure 7a, 7b is made as a single piece, namely the thickened portion 40 provided with one or more water ports 42 is made integral with the rest of the beam, the cross-section of which always has a non-uniform changing width, because of the presence of this thickened portion 40 and the carrier lugs 44.

In reference to FIGS. 10 to 13, a third preferred embodiment is represented which is different from the previous ones by the fact that the notched assemblies 6a, 6b thereof are not solid, but each made by several pieces assembled to each other delimiting an empty space 50 therebetween for passing a water film. To ensure circulation of the water film, the ports 42 also pass through the structures 7a, 7b for mechanical strength, as is better visible in FIG. 12.

In this third preferred embodiment, the edges 6a', 6a", 6b' and 6b" are provided with the same type of notches 24', 24", 22', 22" as those described in connection with the first preferred embodiment. Thus, these notches are created together by undercuts facing each other, provided on the constituent elements of each assembly 6a, 6b.

Figure 13:
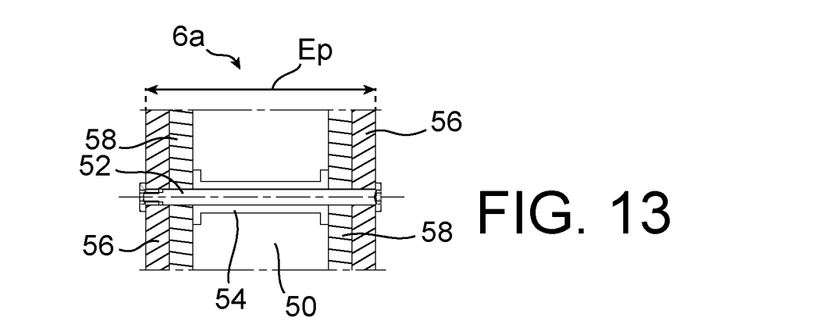
FIG. 13 represents a transverse cross-section view of one of the notched assemblies forming the first stages of the storage device.

In reference more precisely to FIG. 13, one of the assemblies 6a is represented in a cross-section in a plane passing outside the notches thereof. Of course, the assemblies 6b have an identical or similar design.

The assembly 6a is generally made by two half parallel assemblies, connected to each other by attachment means 52 passing through spacers 54 separating these half assemblies, and located in the empty space 50.

Each half assembly includes a substantially planar external wall 56 and made of an aluminium alloy free of neutron absorbing elements. It is in these external walls 56 that the undercuts are made for forming the notches 24', 24", 22', 22". In addition, each half assembly comprises a substantially planar internal wall 58 with a smaller thickness, pressed against the internal surface of its associated wall 56. The walls 58 are made of a material comprising neutron absorbing elements, for example an alloy comprising boron carbide (B4C), preferably an aluminium based alloy. The internal walls 58 facing each other, delimiting the empty space 50, have a substantially constant cross-section, free of notches.

Of course, various modifications can be brought by those skilled in the art to the storage devices 1 just described, only by way of non-limiting examples.

What is claimed is:

1. A storage device (1) for transporting and/or storing nuclear fuel assemblies, said device including:
   a plurality of adjacent housings (2), each for receiving a nuclear fuel assembly,
   several stacked stages ($E_1$, $E_2$) along a stacking direction (8) parallel to the longitudinal axes (4) of the housings, the housings being delimited fully or partly by said stages,
   first stages ($E_1$, $E_{i-1}$, $E_{i+1}$) for neutron absorption and thermal conductivity, and
   second stages ($E_2$, $E_i$) for mechanical strength alternately arranged with the first stages along said stacking direction (8),
   wherein each first stage ($E_1$, $E_{i-1}$, $E_{i+1}$) comprises at least one notched assembly (6a) extending along a first direction (10) orthogonal to the stacking direction (8), as well as at least one second notched assembly (6b) extending along a second direction (12) orthogonal to the first direction (10) as well as to the stacking direction (8), the first and second assemblies being interlaced and each including at least one element of aluminium alloy comprising boron,
   wherein each second stage ($E_2$, $E_i$) including comprises at least one first structure (7a) extending along the first direction (10) as well as at least one second structure (7b) extending along the second direction (12), the first and second structures being stacked along the stacking direction (8) and each made of one or more materials free of neutron absorbing elements, the first and second structures being each free of notches on their opposite edges along the stacking direction, and each having a transverse cross-section with a height substantially constant all along the stacking direction, and
   wherein for at least one of the second stages ($E_i$) on either side of which a first stage ($E_{i-1}$) and a first stage ($E_{i+1}$) are arranged, the first structure (7a) of the second stage ($E_i$) rests on an edge (6a") of the first notched assembly (6a) of the first stage ($E_{i-1}$) and passes through a notch (22") of the second notched assembly (6b) of this first stage ($E_{i-1}$), whereas an edge (6b') of the second notched assembly (6b) of the first stage ($E_{i+1}$) rests on the second structure (7b) of the second stage ($E_i$,), the edge (6b') of the second notched assembly (6b) of the first stage ($E_{i+1}$) passing through a notch (24') of the first notched assembly (6a) of this first stage ($E_{i+1}$).

2. The storage device according to claim 1, wherein the first and second assemblies (6a, 6b) have notches on each of their opposite edges along the stacking direction (8).

3. The storage device according to claim 1, wherein the alternate first structures (7a) and first notched assemblies (6a) form a first housing separating partition (9), on either side of which two housings (2) are at least delimited, and in that the alternate second structures (7b) and second notched assemblies (6b) form a second housing separating partition (11), on either side of which two housings (2) are at least delimited, the first and second separating partitions being orthogonal to each other.

4. The storage device according to claim 3, wherein each first and second partition (9, 11) has a substantially constant thickness (Ep).

5. The storage device according to claim 1, wherein each first stage ($E_1$, $E_{i-1}$, $E_{i+1}$) has, outside an interlaced zone between the first and second notched assemblies (6a, 6b), a first mean height ($H_1$) along the stacking direction (8), in that each second stage ($E_2$, $E_i$) has, outside a crossing zone between the first and second structures (7a, 7b), a second mean height ($H_2$) along the stacking direction (8), and in that the first and second mean heights ($H_1$, $H_2$) fulfil the condition $0.1 < H_2/H_1 < 0.35$.

6. The storage device according to claim 1, wherein the first height ($H_1$) is higher than 100 mm.

7. The storage device according to claim 1, wherein the boron content in at least some of said elements of aluminium alloy of the first and second notched assemblies (6a, 6b) is higher than 25 mg/cm$^3$.

8. The storage device according to claim 1, wherein each first and second structure (7a, 7b) is made of steel.

9. The storage device according to claim 1, wherein each second stage ($E_2$, $E_i$) includes a junction pin (20) at a crossing zone between the first and second structures (7a, 7b) through which this junction pin at least partially passes.

10. The storage device according to claim 1, wherein the first and second structures (7a, 7b) are each of a square or rectangular cross-section.

11. The storage device according to claim 1, wherein the first and second structures (7a, 7b) each have a cross-section with a uniform or non-uniform width.

12. The storage device according to claim 1, wherein water ports (42) extending along the stacking direction (8) pass through each of the first and second structures (7a, 7b).

13. The storage device according to claim 1, wherein the first and second structures (7a, 7b) are each made as a single piece.

14. The storage device according to claim 1, wherein the first and second interlaced notched assemblies (6a, 6b) are each made as a single piece, or with several pieces (56, 58) assembled to each other and preferably delimiting an empty space (50) between them.

15. The storage device according to claim 1, further comprising peripheral walls (14) arranged at the periphery of the first and second stacked stages, said peripheral walls delimiting a part of some of the housings.

16. The storage device according to claim 1, configured such that in an assembled configuration, clearances along the stacking direction (8) are provided at the crossing/interlacing zones between the elements (6a, 6b, 7a, 7b).

17. A package for storing and/or transporting nuclear fuel assemblies, the package comprising a cavity in which a storage device (1) according to claim 1 is housed.

18. A pack comprising a package according to claim 17, as well as fuel assemblies arranged in the housings of the storage device of this package.

\* \* \* \* \*